United States Patent [19]

Grossi

[11] Patent Number: 4,596,398
[45] Date of Patent: Jun. 24, 1986

[54] LIGHT FRAME TRICYCLE

[75] Inventor: Aldo Grossi, Sasso Marconi, Italy

[73] Assignee: Raffaele Giordani S.p.A., Casalecchio di Reno, Italy

[21] Appl. No.: 569,742

[22] Filed: Jan. 10, 1984

[30] Foreign Application Priority Data

Jan. 18, 1983 [IT] Italy .................................. 4713/83[U]
Jan. 18, 1983 [IT] Italy .................................. 4714/83[U]
Jan. 18, 1983 [IT] Italy .................................. 4715/83[U]

[51] Int. Cl.⁴ ............................................. B62K 5/04
[52] U.S. Cl. .................................... 280/282; 74/594.4
[58] Field of Search .............. 280/282, 270, 279, 278, 280/280; 446/95, 120, 121; 74/594.4, 594.5

[56] References Cited

U.S. PATENT DOCUMENTS 2,068,125  1/1937  Kraeft ............................ 280/282 X
2,944,833  7/1960  Wintermantel .................. 280/282
3,811,339  5/1974  Konzorr .......................... 74/594.4
4,350,360  9/1982  Olsson et al. ................... 280/279

FOREIGN PATENT DOCUMENTS 1373313  11/1974  United Kingdom ............... 280/282

Primary Examiner—John A. Pekar
Attorney, Agent, or Firm—Shlesinger Arkwright Garvey & Fado

[57] ABSTRACT

Perfected tricycle comprising a frame made of hollow, plastic tubular elements. The frame comprises a first tube supporting a saddle in the middle, two rear tubular arms each supporting a rear wheel and a second tube at the front supporting a gear at the top and a front wheel at the bottom the hub of which is fitted with two pedals.

11 Claims, 11 Drawing Figures

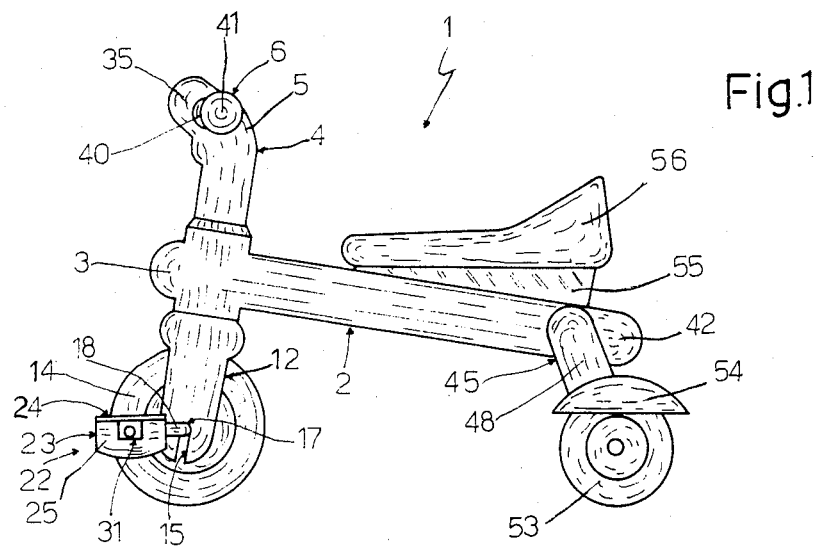
Fig. 1
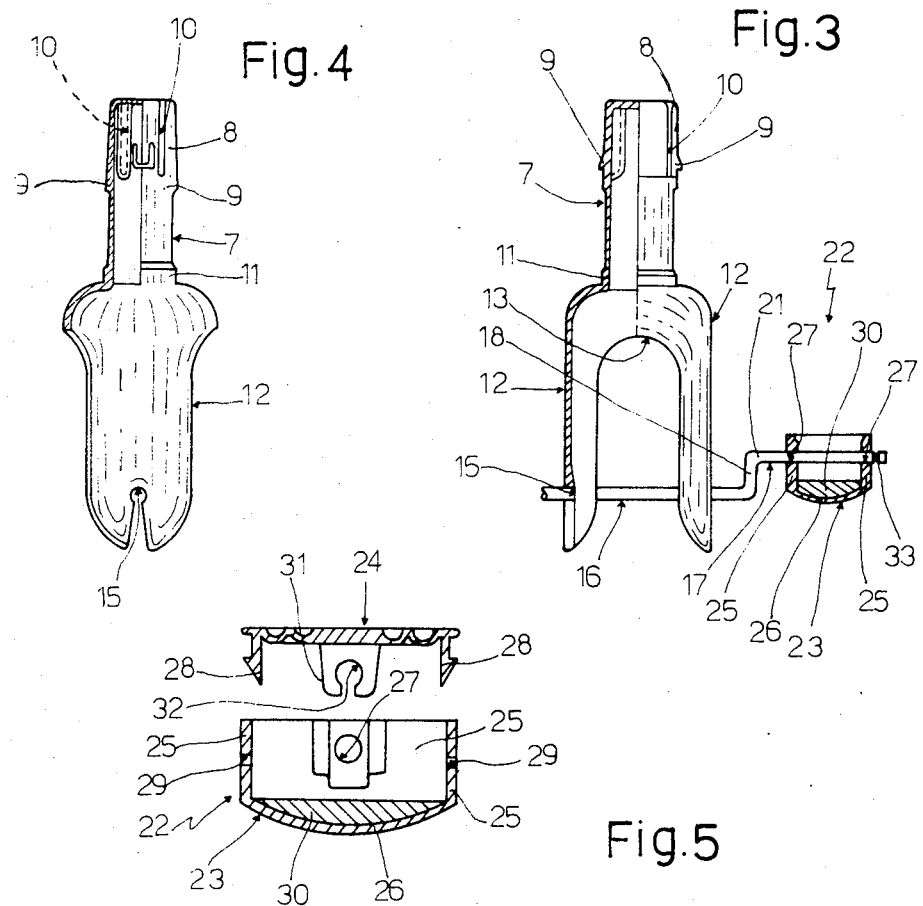
Fig. 4
Fig. 3
Fig. 5

LIGHT FRAME TRICYCLE

SUMMARY OF THE INVENTION

The present invention relates to a light frame tricycle. The aim of the present invention is to provide a tricycle that is easy to assemble and cheap to manufacture. With this aim in view, the present invention relates to a light frame tricycle, characterised by the fact that it comprises a frame made of hollow, plastic tubular elements, the said frame having a first tube supporting a saddle, the longitudinal axis of the said tube converging with the supporting face at an acute angle; a first tubular element designed to turn round its longitudinal axis, extending upwards from a first diametrical hole with its axis perpendicular to the supporting face and located near the front end of the said first tube for supporting a tubular handlebar; a second tubular element designed to turn round its longitudinal axis, extending downwards from the said first diametrical hole and supporting two tabs for supporting a first hub of a front wheel; two first sleeves coaxial with each other and having a first end inside a second diametrical hole, with the axis parallel to the supporting face and located near the rear end of the said first tube, and a second end outside the said second diametrical hole in the opposite direction; two tubular arms, one for each of the said first sleeves, shaped to form an upside-down L and having a first portion coaxial with and connected to the said sleeve and a second portion with its axis perpendicular to the supporting face and supporting a rear wheel.

BRIEF DESCRIPTION OF THE DRAWINGS

A preferred arrangement of the present invention will now be described, by way of a non-limiting example, with reference to the attached drawings in which:

FIGS. 1 and 2 show a side and rear view of a tricycle respectively;

FIGS. 3 and 4 show front and side part sections respectively of a first detail on the FIG. 1 tricycle;

FIG. 5 shows an exploded section of a pedal on the FIG. 1 tricycle;

DETAILED DESCRIPTION OF THE INVENTION

Figure 2:
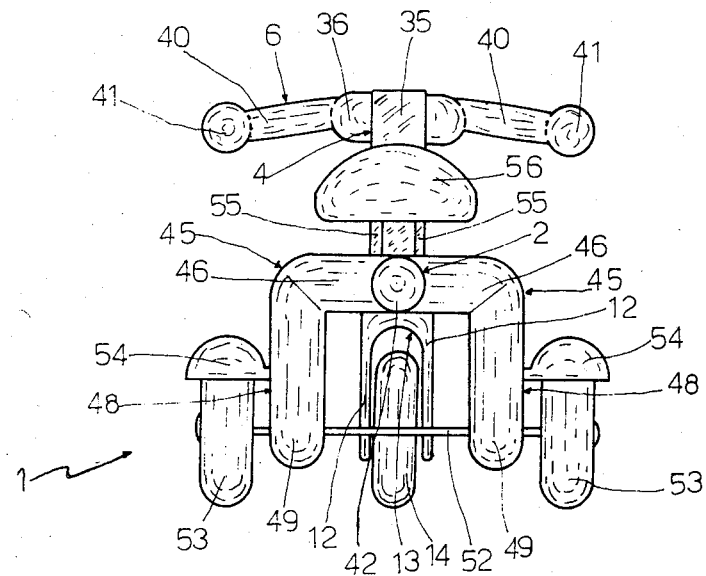

Number 1 in FIGS. 1 and 2 indicates a perfected tricycle comprising a frame made of plastic tubular elements. The said frame comprises a tube (2) with its longitudinal axis converging with the supporting face at an acute angle and having near its front end (3) a diametrical hole with its axis converging with the supporting face at roughly 90°. The said hole accommodates the bottom end of a tubular element (4) supporting a tubular handlebar (6) at the top end (5).

As shown in FIGS. 3 and 4, the said hole in tube (2) also accommodates a tubular element (7) the top end (8) of which is provided with longitudinal steps (9) with alternating longitudinal slots (10). The said end (8) is clicked into the bottom end of tubular element (4). To be more precise, steps (9) engage with recesses (not shown) inside the bottom end of element (4) so as to connect the latter firmly to element (7). At the same time, slots (10) accommodate steps (not shown) inside the bottom end of element (4) so as to connect elements (4) and (7) at an angle and so form a single tube designed to turn round its longitudinal axis. Element (7) also has a bottom end (11) fitted with two parallel semi-cylindrical tabs (12).

The latter combine to form a cavity (13) housing a front wheel (14). The rounded bottom ends of tabs (12) are provided with a slot (15) which is engaged by the end portion of hub (16) on wheel (14). Hub (16) is fitted at the ends with two metal sections (17), both L-shaped but asymmetrical in relation to the axis of hub (16). Each section (17) has a first portion (18), connected perpendicularly to the end of hub (16), and a second portion (21) parallel to hub (16) and supporting a pedal (22) which turns round the said portion (21).

As shown in FIGS. 3, 4 and 5, pedal (22) is made in two parts, that is, it comprises a main cup-shaped part (23) and a cover (24) the top face of which is flat. Main part (23) has four sides (25), each parallel to the opposite side, and an internally concave base (26). Two opposite sides (25) have a hole (27) so that portion (21) can be fitted inside main part (23) through one hole (27) and emerge from part (23) through the other hole (27). From two opposite sides of the bottom face of cover (24) two hooks (28) extend downwards so as to engage with cavities (29) on sides (25) adjacent to those provided with hole (27). Cover (24) is clamped on to main part (23) when hooks (28) engage with cavities (29). Base (26) inside main part (23) is fitted with a weighted body (30) heavier than the other parts on pedal (22) so as to determine the centre of gravity of pedal (22). The centre of gravity is thus located inside the said body (30) so as to keep pedal (22) in the position shown in FIG. 1, that is, with cover (24) at the top of main part (23) so as to keep the outer face of cover (24) parallel to the supporting face of tricycle 1. Cover (24) has a coplanar piece extending over the face defined by the top edges of sides (25) on main part (23). From the said piece, a tab (31) (FIG. 5) extends downwards parallel to the outermost side (25) and perpendicular to portion (21). The said tab (31) has a slot (32) which is engaged by part (33) on portion (21) extending from main part (23) and smaller in diameter than the remaining part of portion (21). When part (33) engages with slot (32), it enables the entire pedal (22) to turn round portion (21) within the part of the same protruding from portion (21).

Figure 10:
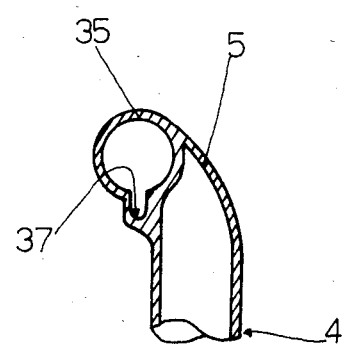
FIG. 10 shows a part section of a fourth detail on the FIG. 1 tricycle.
Figure 11:
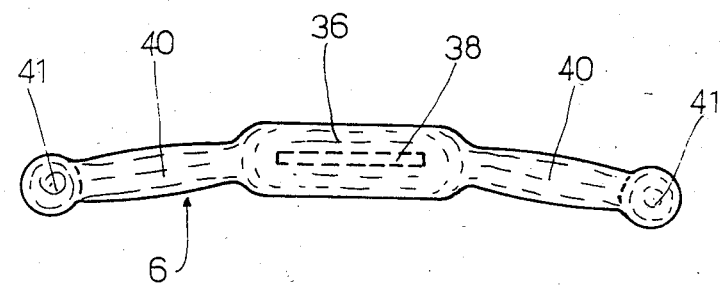
FIG. 11 shows a plan view of the handlebar on the FIG. 1 tricycle.

As shown in FIG. 10, the top end (5) of element (4) is bent slightly towards the front of tricycle (1), that is, in the travelling direction of the latter. End (5) supports a tubular sleeve (35) with its longitudinal axis parallel to the supporting face and designed to accommodate the centre portion (36) (FIG. 11) of handlebar (6). To be more precise, the bottom inside part of sleeve (35) has a slot (37) running along its entire length and designed to accommodate a step (38) (shown by the dotted line in FIG. 4) extending towards the bottom of centre portion (36) of handlebar (6). The engagement of these parts prevents handlebar (6) from turning round its longitudinal axis. From the opposite end of the said centre portion (36) of handlebar (6) two arms (40) extend with an essentially spherical end portion (41). Arms (40) constitute the two handgrips on handlebar (6) and are smaller in diameter than portion (36). The longitudinal axis of handlebar (6) is essentially parabolic.

Figure 6:
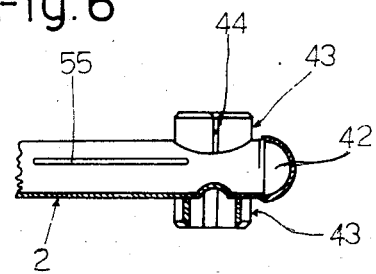
FIG. 6 shows a part section, viewed from above, of a second detail on the FIG. 1 tricycle.
Figure 7:
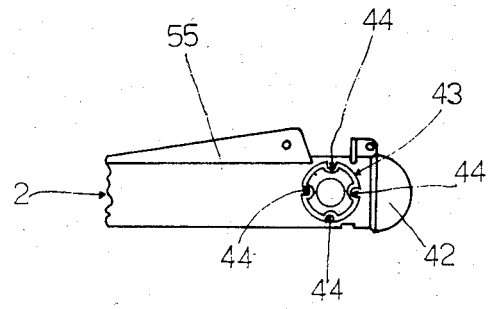
FIG. 7 shows a side view of the second detail in FIG. 6.
Figure 9:
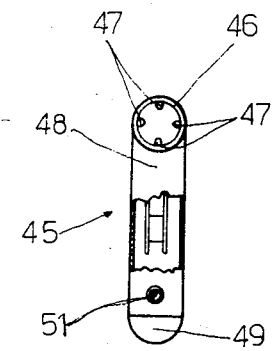
FIG. 9 shows a part section, viewed from the side, of the third detail in FIG. 8.
Figure 8:
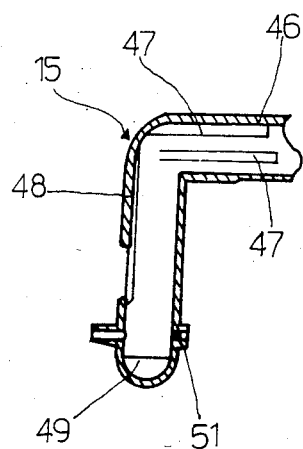
FIG. 8 shows a section of a third detail on the FIG. 1 tricycle.

As shown in FIGS. 6 and 7, near its rear end (42), tube (2) has a diametrical hole with its axis parallel to the supporting face and from the two opposite ends of which extend two sleeves (43) coaxial with each other and with the said hole. The said sleeves (43) are provided on the outer face with a number of longitudinal slots (44). As shown in FIGS. 2, 8 and 9, the said sleeves (43) are fitted with two tubular arms (45) in the shape of an upside-down L a first portion (46) of which is coaxial with and fitted to sleeve (43). To be more precise, sleeve (43) is housed inside portion (46) and slots (44) are engaged by longitudinal steps (47) inside the said portion (46). Each arm (45) has a second portion (48) with its axis perpendicular to the supporting face and which, near bottom end (49), has a diametrical hole (51) engaged by the hub (52) on the two rear wheels (53). To be more precise, hub (52) fits into holes (51) on both of arms (45) and supports wheels (53) on the ends projecting from portions (48). Each portion (48) supports a semi-cylindrical element (54) with its concave section facing the supporting face and placed over respective wheel (53). The said element (54) is designed to form a fender. From tube (2), two pieces (55) extend upwards for assembling saddle (56).

As shown clearly on the attached drawings, none of the tubular elements constituting the frame on tricycle (1) have sharp edges. In face, ends (3) and (42) on tube (2) are semi-spherical, end (5) on element (4) supports sleeve (5) which is tubular, handlebar (6) has two semi-spherical ends, the bottom ends of tabs (12) are rounded off, the bottom ends (49) of tubular arms (45) are semi-spherical and the parts connecting portions (46) and (48) are rounded off externally. As already mentioned, the frame of tricycle (1) is made of hollow, plastic tubular elements which are injection molded to provide for uniform thickness and reduce material waste. Injection molding also provides for better finish of the component parts and, consequently, for improving the appearance of tricycle (1).

Assembling pedals (22) on sections (17) is performed very easily. First of all, portion (21) is fitted inside main part (23) so that the end comes out on the other side of the said part (23) and cover (24) is pressed down on to main part (23) so as to engage hooks (28) with cavities (29) and, at the same time, fit part (33) or portion (21) into slot (32) of tab (31). Though designed to turn round portion (21), pedal (22) will tend to remain in the position shown in FIG. 1 on account of the location of its centre of gravity. Cover (24), which is flat on the outside, serves as a foot-rest for the rider.

Handlebar (6) is fitted inside sleeve (35) by simply inserting handlebar (6) into one side until its centre portion (36) corresponds with sleeve (35) and step (38) engages slot (37).

Arms (45) are fitted on to sleeves (43) by simply fitting the said sleeves (44) into respective portions (46) on arms (45) so that steps (47) engage with slots (44).

Manufacturing the frame using tubular elements with no sharp edges renders tricycle (1) accidentproof in that all the projecting parts that may be collided with are rounded off. Besides providing for a high degree of safety, tricycle (1) is easy to assemble, cheap to manufacture and, on account of the material used, also lightweight.

To those skilled in the art it will be clear that changes can be made to tricycle (1) described and illustrated by way of a non-limiting example, without, however, departing from the scope of the present invention.

I claim:

1. A light frame tricycle particularly for children comprising a frame realized with hollow, tubular elements made of plastic, the said frame comprising a saddle defining a supporting surface and supported by a tube, the longitudinal axis of which converges with the supporting surface at an acute angle; a first and a second tubular element connected to each other and mounted for rotation around their longitudinal axis inside a hole having its axis substantially perpendicular to the supporting surface and provided through the front end of said tube, said first element extending upwards from said hole and supporting a tubular handlebar and said second element extending downwards from said hole and supporting two tabs for bearing a hub of a front wheel of the tricycle; two sleeves coaxial with each other and having respective opposite ends fitted inside a second hole, having the axis parallel to the supporting surface and provided through the rear end of the said tube; and two tubular L-shaped arms located on the opposite sides of said tube, each of which is coupled with one of said sleeves; said tricycle further comprising respective pedals for said front wheel, said pedals comprising a cup-shaped main part having four sides and an internally concave base, a cover for closing the said main part and a weighted part housed inside the main part so as to locate the center of gravity of the pedals toward said base.

2. The light frame tricycle according to claim 1, wherein said L-shaped arms comprise a first portion coaxial with and connected to said sleeves and a second portion having its axis perpendicular to the supporting surface, and a hole provided through said second portion perpendicularly therewith and housing a hub for bearing a couple of rear wheels.

3. The light frame tricycle according to claim 2, wherein the protruding parts on the said frame have no sharp edges, and said ends of the said tube and the said bottom ends of said arms being semi-spherical, and the bent part of the said tubular arms and the bottom ends of the said tabs being rounded off.

4. The light frame tricycle according to claim 1, wherein the outer surface of each of said sleeves has longitudinal slots engaged by a respective steps provided inside the first portion of the tubular arms.

5. The light frame tricycle according to claim 1, wherein the said tabs are semi-cylindrical, parallel to each other and have a slot provided through their bottom end, and engaged by the end of the said hub of the front wheel, the latter being housed in the cavity defined between the said tabs.

6. The light frame tricycle according to claim 5, further comprising two L-shaped metal sections fitted into the opposite ends of said hub of the front wheel, said section comprising a first portion, having its axis perpendicular to that of said hub of the front wheel, and a second portion, having its axis parallel to that of the same and supporting said pedals, these latter being mounted for rotation around said second portion of said sections.

7. The light frame tricycle according to claim 6, wherein said cover of said pedals is provided with at least two hooks extending downwards so as to click into respective cavities provided on the said sides of the main part.

8. The light frame tricycle according to claim 7, wherein said cover is provided with a tab extending downwards outside the said main part and parallel to one of the said sides, said tab having a slot engaged by a smaller diameter part of the said second portion of the said section.

9. The light frame tricycle according to claim 5, wherein the top end of said second tubular element has at least two steps designed to engage with respective recesses inside the bottom end of said first tubular element; the said end of the said second tubular element also having a number of slots engaged by respective steps provided inside the bottom end of said first tubular element.

10. The light frame tricycle according to claim 1, wherein the top end of said first tubular element is provided with a seat having the longitudinal axis parallel to the supporting face and housing a center portion of said handlebar; the latter comprising two side portions having the free ends essentially spherical-shaped.

11. The light frame tricycle according to claim 10, wherein said center portion presents a step designed to engage a slot of said seat; the longitudinal axis of the said handlebar being essentially parabolic and the said top end of the said first tubular element being bent in the forward travelling direction.

* * * * *